Patented Nov. 20, 1923.

1,475,156

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING ARTIFICIAL CRYOLITE.

No Drawing.   Application filed July 1, 1922. Serial No. 572,322.

*To all whom it may concern:*

Be it known that I, HENRY HOWARD, a citizen of the United States, residing at Cleveland, in the county of Cuyahoga and State of Ohio, have invented certain new and useful Improvements in Processes of Making Artificial Cryolite, of which the following is a specification.

This invention relates to a process of making artificial cryolite.

Artificial cryolite, $Al_2F_6.6NaF$, may be prepared by combining in solution aluminum fluorid and sodium fluorid in the proportions indicated by the formula but for the commercial manufacture of artificial cryolite it is desirable to avoid the preliminary preparation of the two salts in pure form.

A method heretofore employed for the manufacture of artificial cryolite consists in adding sodium carbonate to a solution of aluminum fluorid in hydrofluoric acid the artificial cryolite being formed as represented by the equation.

$$Al_2F_6 + 6HF + 3Na_2CO_3 = Al_2F_6.6NaF + 3H_2O + CO_2.$$

In this process the solution of aluminum fluorid in hydrofluoric acid may be prepared by dissolving aluminum hydrate in an excess of hydrofluoric acid. The process works satisfactorily but the sodium carbonate is expensive. It has been attempted to substitute sodium chlorid for the sodium carbonate in the above process but the product was found not to be artificial cryolite but a compound containing a considerably larger proportion of aluminum than is indicated by the formula $Al_2F_6.NaF$.

I have now found that artificial cryolite, the composition of which corresponds much more closely to the formula $Al_2F_6.NaF$ may be prepared in an economical manner from various sodium salts other than sodium carbonate, particularly the inexpensive sodium salts of strong acids such as, sodium chlorid, sodium sulfate, sodium acid sulfate, sodium nitrate, etc.

My process consists in combining aluminum fluorid or aluminum hydrate and hydrofluoric acid in the proportions necessary to form aluminum fluorid with a sodium salt of a strong acid, hydrofluoric acid in quantity sufficient to combine with the sodium to form sodium fluorid, and a reagent capable of neutralizing the strong acid generated by the action of the hydrofluoric acid upon the sodium salt. I have found that by completing the reaction between aluminum fluorid, hydrofluoric acid and a sodium salt of a strong acid in a practically neutral solution or preferably by neutralizing the strong acid generated by the action of hydrofluoric acid upon the sodium salt as it forms true artificial cryolite may be produced.

The preferred reagent for neutralizing the acid generated by the action of hydrofluoric acid upon the sodium salt is ammonia which may be used in an inexpensive form such as ammonical gas liquor of the grade of powder maker's ammonia. It will be apparent that other neutralizing agents may be employed such as ammonium carbonate and my invention includes the use of such agents in case their use may become expedient. Under present conditions ammonical gas liquor is preferred because it is inexpensive and further because its use results in the production of ammonium salts as valuable by-products of the process.

The reagents entering into the reaction, that is, the source of aluminum such as aluminum hydrate or aluminum fluorid, the hydrofluoric acid, the sodium salt, and the neutralizing agent may be combined in a variety of ways.

For example, aluminum fluorid, ammonium fluorid and the sodium salt may be brought together in solution, the salts being added simultaneously or in any desired sequence or a solution of aluminum fluorid and the sodium salt may be treated with hydrofluoric acid and ammonia added simultaneously or alternately in small amounts, or a solution of aluminum fluorid in hydrofluoric acid may be added to a solution of the sodium salt simultaneously with the addition of ammonia. My invention embraces all of the above mentioned procedures for combining the reagents or any other procedure which involves the use of a sodium salt of a strong acid other than hydrofluoric acid and which results in a substantially neutral reaction mixture containing the components of cryolite. It is preferred to combine the reagents in such a way that acid generated by the action of hydrofluoric acid upon the sodium salt is neutralized as it is formed.

The process is illustrated in the following example in which sodium sulfate is the sodium salt employed, it being understood however that the invention is not limited to the use of sodium sulfate or to the details of procedure described excepting as is required by the appended claims.

*Example.*

In one vessel I prepare a solution of aluminum fluorid in hydrofluoric acid by dissolving one molecular equivalent of aluminum hydrate, $Al_2O_3.3H_2O$ in twelve molecular equivalents of hydrofluoric acid. In a separate vessel I prepare a solution containing three molecular equivalents of $Na_2SO_4$. The aluminum fluorid solution is then slowly added to the sodium sulfate solution simultaneously with the addition of gas liquor, the aluminum fluorid solution and the gas liquor being added at a relative rate sufficient to maintain the reaction mixture slightly acid until all of the aluminum fluorid solution has been added whereupon sufficient gas liquor is added to neutralize the reaction mixture.

The reaction is carried out at about room temperature, the reaction mixture being stirred or agitated during the reaction. When the reaction is complete, that is, when the solution containing six molecular equivalents of aluminum fluorid and six molecular equivalents of hydrofluoric and the solution containing three molecular equivalents of sodium sulfate have been mixed and neutralized, the precipitate of articificial cryolite is separated, washed and dried and the mother liquor is treated for the recovery of ammonium sulfate.

The concentrations of the solutions employed in the reaction may vary considerably. Since artificial cryolite is only slightly soluble the solutions may be fairly dilute. On the other hand, in order to avoid the handling of large bodies of liquid and in order to obtain the ammonium sulfate in fairly concentrated form, concentrated solutions should be employed. It is observed however that the solutions should preferably be sufficiently dilute to hold the reacting salts and the reaction products other than artificial cryolite in solution.

The reactions of the process described in the above example are illustrated by the following equations.

(1) 
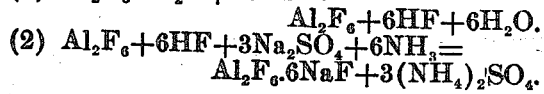

(2) $Al_2F_6 + 6HF + 3Na_2SO_4 + 6NH_3 =$
$Al_2F_6.6NaF + 3(NH_4)_2SO_4$.

If sodium acid sulfate, niter cake, is used the free acid is first neutralized by treatment with ammonia and the remainder of the process is then the same as when sodium sulfate is used, the yield of ammonium sulfate being increased by the amount formed in neutralizing the free acid.

It will be seen that the components of the double salt $2NaF.Na_2SO_4$ theoretically will be present in the reaction mixture but due to the lesser solubility of artificial cryolite, the double salt is not formed or at least does not appear as an end-product of the reaction.

When sodium nitrate or sodium chlorid is substituted for sodium sulfate in the process outlined in the above example the procedure may be the same as that described but ammonium nitrate or ammonium chlorid is produced as the by-product.

It will be apparent that other salts of sodium or mixtures of sodium salts may be used in place of sodium sulfate.

This application is a continuation in part of my application Serial Number 538,646, filed February 23, 1922.

I claim:—

1. Process of making artificial cryolite which comprises, reacting upon sodium sulfate with hydrofluoric acid in the presence of aluminum fluorid, and neutralizing the acid generated in the reaction.

2. Process of making artificial cryolite which comprises combining aluminum fluorid, ammonium fluorid and sodium sulfate in a substantially neutral reaction mixture.

3. Process of making artificial cryolite which comprises, adding hydrofluoric acid to a solution containing sodium sulfate in the presence of aluminum fluorid, and maintaining the solution only slightly acid during the addition of the hydrofluoric acid by the addition of a neutralizing agent to the solution.

4. Process of making artificial cryolite which comprises, simultaneously adding a solution of aluminum fluorid in hydrofluoric acid and a solution of ammonia to a solution of sodium sulfate.

5. Process of making artificial cryolite which comprises, reacting upon sodium sulfate with hydrofluoric acid and aluminum fluorid in the presence of a neutralizing agent in quantity sufficient to maintain the reaction mixture only slightly acid.

6. Process of making artificial cryolite which comprises, dissolving one molecular equivalent of aluminum hydrate in a water solution of twelve molecular equivalents of hydrofluoric acid, mixing the resulting solution with a solution containing three molecular equivalents of sodium sulfate, and maintaining the mixture only slightly acid during the mixing operation by the addition of ammonical gas liquor thereto.

7. Process of making artificial cryolite which comprises, neutralizing the free acid of sodium acid sulfate with ammonia, and adding to a solution of the neutral product a solution of aluminum fluorid in hydrofluoric acid and ammonia at a relative rate sufficient to maintain the mixed solutions only slightly acid.

8. Process of making artificial cryolite which comprises reacting upon sodium sulfate with a solution of aluminum fluorid in hydrofluoric acid, and neutralizing the acid generated in the reaction.

9. Process of making artificial cryolite which comprises reacting upon aluminum hydrate and sodium sulfate with hydrofluoric acid and neutralizing the acid generated in the reaction.

10. Process of making artificial cryolite which comprises reacting upon aluminum hydrate and sodium sulfate with hydrofluoric acid, neutralizing acid as it is generated by means of ammonia, and separating and recovering the resulting artificial cryolite and ammonium chlorid.

In testimony whereof, I affix my signature.

HENRY HOWARD.